UNITED STATES PATENT OFFICE.

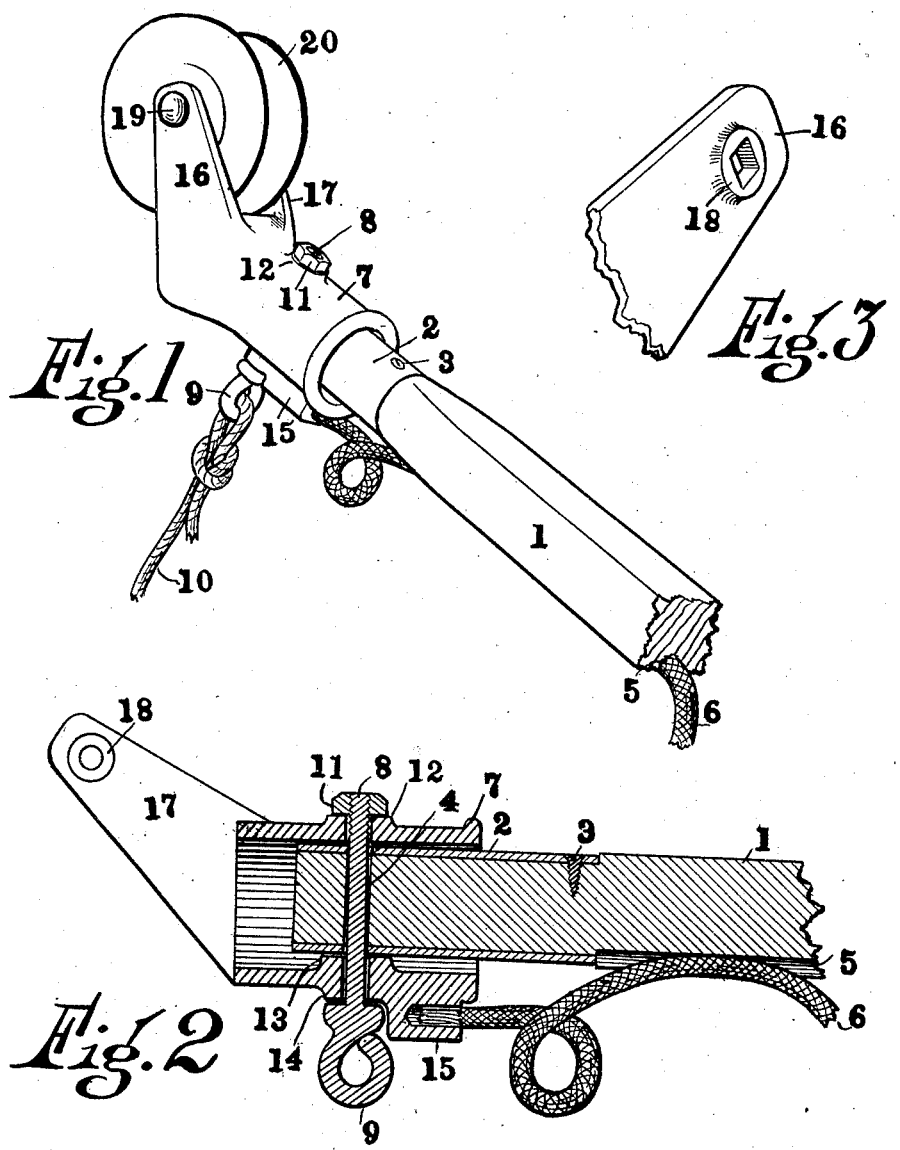

HOWARD B. POTTS, OF JACKSON TOWNSHIP, GUERNSEY COUNTY, OHIO.

TROLLEY.

972,240.  Specification of Letters Patent.  Patented Oct. 11, 1910.

Application filed January 10, 1910. Serial No. 537,299.

*To all whom it may concern:*

Be it known that I, HOWARD B. POTTS, a citizen of the United States, residing in Jackson township, in the county of Guernsey and State of Ohio, have invented new and useful Improvements in Trolleys, of which the following is a specification.

This invention relates to trolleys for conducting an electric current from the current-conducting wire to a moving vehicle and the primary object thereof is to produce a trolley harp provided with a hollow body portion to receive the end of the trolley pole, which latter is united to the harp by a bolt constituting a pivot therefor to permit lateral movement of the same, thus affording to the harp considerable flexibility of movement, in doing which the recess or opening in the harp is made considerably larger than the outer end of the pole which is inserted in said recess.

A further object of the invention is to mount the trolley wheel in the harp in such a manner that approximately all wear thereon is eliminated, in doing which the harp is provided with an irrevoluble spindle or axle for the wheel so that the former receives the wear incident to the revolution of the latter.

The invention contemplates providing a harp with the usual bifurcated arms constituting means for supporting a shaft or axle for the trolley wheel, said arms provided with means to prevent revolution of the axle or shaft so that the wear incident to the revolution of the wheel is imposed upon the axle itself, in doing which it contemplates providing one of the bifurcated arms of the harp with an aperture other than cylindrical, so that a bolt such as a carriage bolt may be utilized as an axle, and the squared portion of the shank thereof seating in an aperture in one of the arms prevents the revolution of the axle in unison with the trolley wheel, and as bolts of this character are comparatively cheap, the renewal of the same requires little or no expense.

A still further object of the invention is to so construct the harp that its removal from one trolley pole and its replacement upon another may be readily accomplished without the necessity of special tools or special skill on the part of the operator.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the claims hereunto appended.

In the drawings, in which similar reference numerals indicate like parts in the different figures: Figure 1 is a perspective view of the upper end of a trolley pole with a harp embodying this invention mounted thereon. Fig. 2 is a longitudinal, sectional view of the device shown in Fig. 1; and, Fig. 3 is a perspective view of the inner face of one of the bifurcated arms of the trolley harp, showing a preferred construction thereof.

Referring to the drawings, the reference numeral 1 denotes the trolley pole, preferably having on the outer end thereof a ferrule 2 secured against displacement by means of a set screw 3. The pole 1 is provided near the outer end thereof with an aperture 4 extending transversely therethrough. The pole 1 is also preferably provided with a groove 5 on its under face to receive an insulated current conductor 6.

The harp comprises a body portion 7, preferably cylindrical, although it may have any desired cross-sectional configuration and with a recess therein having a diameter greater than the diameter of the ferrule 2. This harp is provided with two alined apertures through which is passed a pivot bolt 8 which also extends through the aperture 4 in the end of the trolley pole, thereby pivoting the harp upon the pole to allow lateral movement or flexibility to the harp. The pivoting bolt 8 is preferably provided with an eye 9 at one end to which is secured a rope 10 commonly used for manually controlling the movement of the trolley, and at the other end with a nut 11 adapted to be screwed up against a boss 12 surrounding the aperture through which the bolt 8 extends. The opposite side of the harp is provided with an interior boss 13 to bear against the ferrule 2 and an exterior boss 14 on which the head of the bolt 8 seats. The underface of the harp is provided with a lug 15 having an opening in which the end of the current-conductor 6 is anchored to form an electric contact therewith. The upper end of the harp is provided with spaced or bifurcated arms 16 and 17 each of which is provided with an apertured inwardly-extending boss 18 with the apertures of the two bosses in transverse alinement. The aperture in the boss on the arm 16 is preferably square or made other than cylindrical, so that a pivot bolt or spindle 19 having a squared shank portion inserted therein will not revolve in unison with the trolley wheel 20 which is mounted thereon.

The invention comtemplates providing each of the arms 16 and 17 with inturned bosses 18, surrounding the apertures in which is mounted the shaft or spindle, to prevent the trolley wheel 20 from shifting laterally on its shaft and wearing the arms 16 and 17, thus avoiding the necessity of using loose washers for this purpose, in doing which the invention contemplates avoiding all unnecessary wear upon the harp, for the reason that the latter is the most expensive part of the construction of the trolley, and by employing this construction, the revolution of the wheel under service conditions will ordinarily wear only the wheel and the comparatively cheap bolt which constitutes the axle therefor.

It will be noted that the end of the trolley pole is smaller than the diameter of the interior of the recess in the harp 7, and as the pivoting bolt extends transversely through said harp, a considerable amount of lateral movement is permitted the harp with respect to the pole, sufficient to relieve both from strain and the wear incident to the lateral movement of the wheel in traveling over a poorly alined trolley wire, and at the same time the current derived from the trolley wire is conveyed from the wheel 20 through the arm 16 to the harp 7 and from thence through the conductor 6 to the motors in the vehicle. The bolt 8 which constitutes the pivot for permitting lateral movement of the harp with respect to the upper end of the trolley pole being provided with an eye 9 the latter constitutes efficient means for connecting the rope to the harp.

I claim:

1. In a trolley, the combination with a wheel-bearing-harp provided with a tubular lower end having extending therethrough a cylindrical opening, said tubular lower end provided with a laterally-projecting lug having a recess to receive the end of a current-conducting wire, of a trolley-pole one end of which is arranged to be inserted in said cylindrical opening, the diameter of the end of said pole being less than the internal diameter of said opening to permit movement of one of said elements with respect to the other and a pivoting bolt extending through the tubular portion of said harp and the end of said pole for loosely connecting said elements together, substantially as described.

2. In a trolley, the combination with a wheel-bearing-harp provided with a tubular lower end having a cylindrical opening therein and further provided with oppositely-disposed apertures, a trolley-pole of less diameter than the diameter of said opening inserted therein and provided with a transverse opening positioned in alinement with said apertures, a bolt constituting a pivot for loosely uniting said harp and pole together mounted in said apertures and extending through the opening in said pole, one end of said bolt formed to constitute means for connection with a rope for manually manipulating said trolley-pole, substantially as described.

3. In a trolley, the combination with a wheel-bearing-harp provided with a tubular lower end having a cylindrical opening therein and further provided with oppositely-disposed apertures, a trolley-pole provided with a ferrule at one end thereof of less diameter than the diameter of said opening inserted therein and provided with a transverse opening positioned in alinement with said apertures, a bolt constituting a pivot for loosely uniting said harp and pole together mounted in said apertures and extending through the opening in said pole, one end of said bolt formed to constitute means for connection with a rope for manually manipulating said trolley-pole, substantially as described.

In testimony whereof I have hereunto set my hand in presence of two subscribing witnesses.

HOWARD B. POTTS.

Witnesses:
CHARLES B. ASTON,
L. C. HESKELL.